United States Patent [19]

Matsuura et al.

[11] Patent Number: 4,899,707
[45] Date of Patent: Feb. 13, 1990

[54] ENGINE CYLINDER HEAD WITH PRECOMBUSTION CHAMBERS USING CERAMICS INSERT

[75] Inventors: Tooru Matsuura; Yoshinori Narita, both of Aichi Prefecture, Japan

[73] Assignee: NGK Spark Plug Company, Limited, Nagoya, Japan

[21] Appl. No.: 156,570

[22] Filed: Feb. 17, 1988

[30] Foreign Application Priority Data

Feb. 23, 1987 [JP] Japan .............................. 62-24211[U]

[51] Int. Cl.$^4$ ............................................. F02B 19/14
[52] U.S. Cl. .................................................... 123/270
[58] Field of Search ...... 123/193 C, 193 CH, 193 CP, 123/193 P, 193 H, 270, 271, 272, 668, 669, 254; 501/152, 134; 29/156.4 WL

[56] References Cited

U.S. PATENT DOCUMENTS

| | | | |
|---|---|---|---|
| 3,786,795 | 1/1974 | Kaneko et al. | 123/193.4 |
| 3,919,755 | 11/1975 | Kaneko et al. | 123/193 H X |
| 4,194,917 | 3/1980 | Sakemi et al. | 501/152 X |
| 4,426,966 | 1/1984 | Hüther et al. | 123/270 X |
| 4,471,017 | 9/1984 | Poeschel et al. | 123/193 H X |
| 4,559,911 | 12/1985 | Bodine | 123/271 |
| 4,562,806 | 1/1986 | Gonnord et al. | 123/270 |
| 4,577,600 | 3/1986 | Morita et al. | 123/270 |
| 4,600,038 | 7/1986 | Matsui et al. | 123/41.84 |
| 4,651,692 | 3/1987 | Morita et al. | 123/271 X |

Primary Examiner—Willis R. Wolfe
Attorney, Agent, or Firm—Foley & Lardner, Schwartz, Jeffery, Schwaab, Mack, Blumenthal & Evans

[57] ABSTRACT

The invention relates to a cylinder head for an internal combustion engine in which each combustion chamber has a prechamber. A cast metal body of the cylinder head has recesses each of which provides a prechamber, and a hollow and, for example, bell-shaped member of an adequately porous ceramics is cast-inserted in the inner surface defining each recess. Use is made of a ceramics low in thermal expansion coefficient and heat conductivity, such as aluminum titanate or cordierite, and the porosity of the ceramics is limited within the range of from 5 to 20%. The cast-inserted ceramics member can easily be machine-finished and, without any extra treatment, has sufficient strength and durability.

6 Claims, 1 Drawing Sheet

ENGINE CYLINDER HEAD WITH PRECOMBUSTION CHAMBERS USING CERAMICS INSERT

BACKGROUND OF THE INVENTION

This invention relates to precombustion chambers in internal combustion engines, and more particularly to a cylinder head with precombustion chambers each of which is provided by inserting a hollow member of ceramics in a recess of a cast metal body of the cylinder head.

In some internal combustion engines represented by diesel engines each combustion chamber is made up of a main combustion chamber and a precombustion chamber, or simply prechamber, in which combustion is initiated. For the sake of improvements in engine startability, emission controls and/or heat insulation, studies have been made to use ceramics as the wall material for prechambers in a cylinder head. A primitive way is preparing a cast metal body of the cylinder head with generally semispherical recesses and, separately, hollow members of a ceramics good in heat insulation, heat resistance and corrosion resistance and then tightly fitting the ceramics members into the respective recesses of the cast metal body.

Actually, however, the incorporation of the hollow ceramics members encounters problems. In operation of the engine a considerable gradient of temperature is produced between the outer and inner wall faces of the ceramics member for each prechamber, so that the ceramics member is liable to break or crack by thermal shocks attributed to repeated heating and cooling. Also it is likely that the ceramics member is damaged by sharp changes in the pressure in the prechamber during each combustion stroke.

It has been tried to cope with the problem of fragility by selectively using a high-strength ceramics such as zirconia ceramics or silicon nitride ceramics. Besides, cast-insertion of the hollow ceramics members has been employed in casting of the cylinder head with a view to inducing compressive stress in the ceramic members at the stage of their insertion to thereby enhance their endurance to thermal shocks and pressure changes. However, an almost inevitable result of the cast-insertion method is degradation of dimensional precision of the inserted ceramics members. Accordingly it is desirable to correct the induced dimensional errors by machining subsequent to the casting operation, but this is difficult when a high-strength ceramics of the aforementioned class is used since such a ceramics is quite inferior in machinability. Besides, silicon nitride ceramics are considerably high in heat conductivity and, hence, fail to provide a desired degree of heat insulation.

SUMMARY OF THE INVENTION

It is an object of the present invention to obviate the above described problems and difficulties by providing an engine cylinder head with precombustion chambers each using a ceramics insert which is sufficiently tough and durable and can easily be machine-finished after cast-insertion.

According to the invention there is provided a cylinder head for an internal combustion engine, which comprises a cast metal body having at least one recess to provide a precombustion chamber and, for each precombustion chamber, a hollow member which is made of a porous ceramics and is cast-inserted in the inner wall surface of the metal body defining the recess such that the inner surface of the hollow member defines a major portion of the precombustion chamber. The porosity (true porosity as defined hereinafter) of the employed ceramics must be in the range of from 5 to 20%.

In the present invention, toughness of the hollow ceramics member used for each prechamber is ensured by inserting that member at the stage of casting the metal body of the cylinder head. Accordingly there is no need to use a hardly machinable high-strength ceramics such as silicon nitride ceramics, and it is possible to selectively use a ceramics high in heat insulating capability, fairly low in thermal expansion coefficient, sufficiently resistant to thermal shocks, easy to cast-insert in casting alloys and relatively good in machinability. In this invention preferred ceramics are aluminum titanate ceramics and cordierite ceramics. Aluminum titanate has a fairly low coefficient of thermal expansion and good resistance to thermal shocks, and is excellent in heat insulating capability since its heat conductivity is below 1/10 of the heat conductivities of alumina and silicon nitride. In these regards, cordierite is comparable to aluminum titanate.

Usually the cast-inserted hollow member of the ceramics needs to be machined to satisfy requirements as to dimensional precision. According to the invention, such machining of the cast-inserted ceramics member is made fully practicable by deliberately limiting the porosity of the ceramics within the range from 5 to 20%. If the porosity is lower than 5% the post-casting machining encounters difficulty. On the other hand, the porosity should be limited with consideration of mechanical strength required for the inserted ceramics member. The required minimum of the mechanical strength is 2 kg/mm$^2$, and the ceramics member has a higher strength insofar as its porosity is not higher than 20%. Also as a merit of limiting the maximum of the porosity at 20%, there is no need to impregnate the cast-inserted and subsequently machine-finished ceramics member with a refractory and reinforcing material to fill in the pores with that material. That is, in producing a cylinder head according to the invention the cast-inserted and machine-finished ceramics member can be left in the porous state as machined without any further treatment.

Thus, a cylinder head according to the invention can be produced on an industrial scale by a simplified process and at reduced costs, and in this cylinder head the ceramics insert for each prechamber is sufficiently strong, tough and durable.

In the present invention the term "porosity" (of the employed ceramics) always refers to "true porosity". The true porosity of a porous material is given by $V_1/V_2 \times 100$ (%), wherein $V_1$ is the total volume of the pores in a piece of the porous material and $V_2$ is the whole volume of that piece including its pores. Since most of porous materials have both open pores and closed pores, the true porosity of each material is construed as the sum of its open porosity (usually called apparent porosity) and its closed porosity. The apparent porosity of a ceramics is measured by the following method, which is according to JIS (Japanese Industrial Standard) R 2205.

A sample piece of the ceramics having a dry weight $W_1$ is boiled in clean water and then cooled to room temperature. Successively the wet sample is weighed in a state suspended in water. The thus measured weight is represented by $W_2$. After that the wet sample is taken out of water, and water on the surface of the sample is wiped away with a moist cloth well wrung out in advance. The weight of the thus treated sample is represented by $W_3$. From the three measurements of weight the apparent porosity, $P_A$, of the sample is determined by the following equation (1).

$$P_A(\%) = \{(W_3 - W_1)/(W_3 - W_2)\} \times 100 \tag{1}$$

Furthermore, the true specific gravity, S, of the same porous material is measured by pulverizing the porous material into fine particles and by using an appropriate instrument such as pycnometer. The closed porosity, $P_C$, of the porous material is determined by the following equation (2).

$$P_C(\%) = [(W_1 - W_2)/(W_3 - W_2) - W_1/\{S \times (W_3 - W_2)\}] \times 100 \tag{2}$$

Since the true porosity, $P_T$, is the sum of the righthand term of equation (1) and the righthand term of equation (2), the following equation (3) holds.

$$P_T(\%) = [1 - W_1/\{S \times (W_3 - W_2)\}] \times 100 \tag{3}$$

DESCRIPTION OF THE PREFERRED EMBODIMENTS

Figure 1:
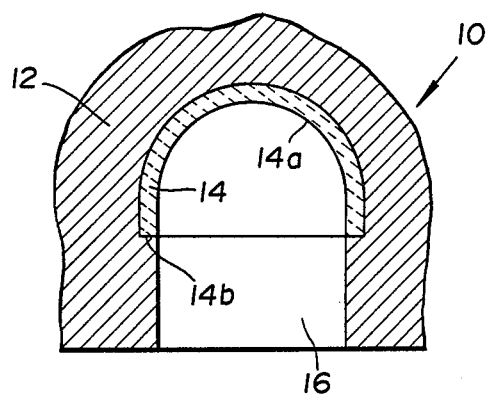
FIG. 1 is a longitudinal sectional view of an unfinished prechamber in a cylinder head according to the invention.

FIG. 1 shows a part of an unfinished cylinder head as an embodiment of the invention. Numeral 12 indicates a body of the cylinder head 10 formed by casting a suitable alloy, and numeral 16 a dome-like recess of the cylinder head body 12. The recess 16 is formed to provide a precombustion chamber. In the depth of the recess 16, a bell-shaped hollow member 14 of an aluminum titanate base ceramics, or a cordierite base ceramics, whose porosity is 5–20% is cast-inserted in the wall face of the alloy body 12. After the casting operation the round inner surface 14a of the hollow member 14 is ground with a suitable machine such as a milling machine to finish the surface 14a precisely into specified dimensions. When the hollow member 14 is cast-inserted such that the end surface 14b of the inserted member 14 is exposed, the end surface 14b too will be machine-finished. No extra treatment is made on the machine-finished ceramics surface 14a.

As an experiment, five samples of the unfinished cylinder head 10 of FIG. 1 were produced by using an aluminum alloy for the cylinder head body 12 and aluminum titanate base ceramics for the hollow member 14. The five samples were different only in the porosity of the ceramics member 14: the porosity was 4% in Sample No. 1, 5% in Sample No. 2, 12% in Sample No. 3, 20% in Sample No. 4 and 25% in Sample No. 5. That is, Samples Nos. 2, 3 and 4 were in accordance with the invention, but Samples Nos. 1 and 5 were outside the scope of the invention.

On every sample the machinability of the cast-inserted ceramics member 14 was evaluated by grinding the inner surface 14a with a milling machine and examining the rate of abrasion of the milling tools. As the result Sample No. 1 (porosity of the ceramics was 4%) was judged to be inferior and unsatisfactory in machinability from very rapid abrasion of the milling tools. whereas Samples Nos. 2 to 5 were all fairly good in machinability. For evaluation of durability of the cast-inserted and machine-finished ceramic member 14, Samples Nos. 2 to 5 were subjected to 300 cycles of sequential heating to 800° C. by a gas burner and cooling to room temperature. After this heat cycle test, cracks were observed in the ceramics member 14 of Sample No. 5 (porosity of the ceramics was 25%), while no cracks appeared in Samples Nos. 2, 3 and 4.

Figure 2:
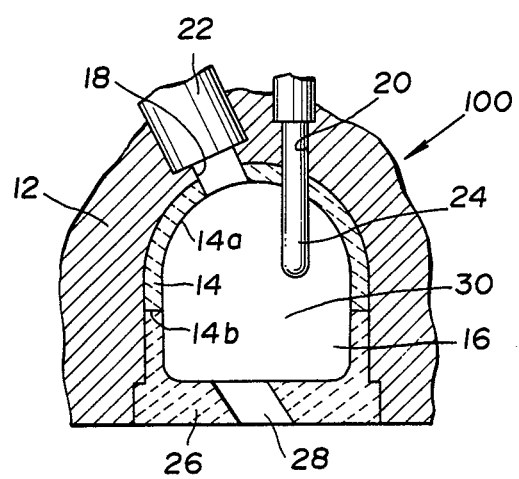
FIG. 2 is a longitudinal sectional view of a finished prechamber in another cylinder head according to the invention.

FIG. 2 shows a part of a cylinder head 100 as another embodiment of the invention. The construction is fundamentally as described with reference to FIG. 1. After casting the cylinder head body 12 with insertion of the bell-shaped hollow member 14 of a suitable ceramics, the inner surface 14a and the end surface 14b of the ceramics part 14 are machine-finished. After that a hole 18 for insertion of a fuel injecting nozzle 22 and another hole 20 for insertion of a glow plug 24 are bored through the metal body 12 and the hollow ceramics member 14, and a closure member 26 made of a ceramics and formed with a nozzle hole 28 is fitted into the opening of the recess 16 to thereby complete a prechamber 30 as a part of a combustion chamber of a diesel engine.

A sample of the cylinder head 100 of FIG. 2 was produced by using an aluminum alloy for the cylinder head body 12 and an aluminum titanate base ceramics having porosity of 12% for the ceramics insert 14. The cylinder head sample was used in an experimental diesel engine, and the engine was operated at 3000 rpm while maintaining the cooling water temperature at 80° C. After the engine operation no change was observed in the cast-inserted ceramics member 14 in every prechamber 30 of the cylinder head sample.

What is claimed is:

1. A cylinder head for an internal combustion engine, comprising:
   a cast metal body having at least one recess which provides a precombustion chamber; and
   a hollow member which is made of a porous ceramics and cast-inserted in the inner wall surface of said cast metal body defining said recess and then machine finished such that the inner surface of the hollow member defines a major portion of the precombustion chamber, the porosity of said ceramics being in the range of from 5 to 20%.

2. A cylinder head according to claim 1, wherein the principal component of said ceramics is aluminum titanate.

3. A cylinder head according to claim 1, wherein the principal component of said ceramics is cordierite.

4. A cylinder head according to claim 1, wherein said hollow member comprises a generally semispherical part.

5. A cylinder head according to claim 4, wherein said hollow member further comprises a generally cylindrical part contiguous to said generally semispherical part.

6. A method comprising:
   forming a cast metal internal combustion engine cylinder head body having at least one recess which provides a precombustion chamber;

cast-inserting a hollow member which is made of a porous ceramic having a porosity in the range of 5 to 20% in the inner surface of the cast metal body defining said recess such that the inner surface of the hollow member defines a major portion of the precombustion chamber; and machine finishing the hollow member.

* * * * *